United States Patent Office  3,542,922
Patented Nov. 24, 1970

3,542,922
3-ALKYLSULFENYLPROPENOIC ACID ESTER-SUBSTITUTED STEROIDS
Sandor Barcza, West Orange, N.J., assignor to Sandoz-Wander, Inc., Hanover, N.J., a corporation of Delaware
No Drawing. Continuation-in-part of application Ser. No. 737,339, June 17, 1968. This application Jan. 10, 1969, Ser. No. 790,450
Int. Cl. C07c 169/02
U.S. Cl. 424—238    6 Claims

ABSTRACT OF THE DISCLOSURE

The compounds are 3-hydroxy- or 3-alkyl ether-17α-(3′-alkyl-sulfenylpropenoic acid ester)-substituted steroids having the configuration of estrone, e.g., 3′-methylsulfenyl-3′-(3-methoxy-17β-hydroxy-1,3,5(10) - estratrien-17α-yl)propenoic acid methyl ester. The compounds have pharmaceutical utility.

---

This is a continuation-in-part of my copending application Ser. No. 737,339 filed June 17, 1968, now abandoned.

This invention relates to chemical compounds, and more particularly to steroids containing a 3-alkylsulfenylpropenoic acid ester moiety, their preparation and use, as well as to the intermediates in the preparation of such compounds.

The above-mentioned steroids of this invention may be represented structurally by Formula I:

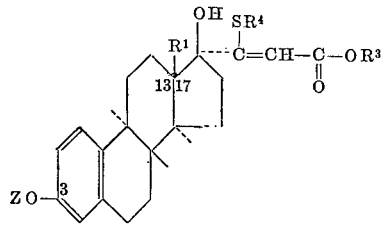

wherein:
Z is a hydrogen atom or $R^2$;
$R^1$ is lower alkyl having from 1 to 3 carbon atoms, i.e. methyl, ethyl, n-propyl or isopropyl; and
each of $R^2$ $R^3$ and $R^4$ is, independently, lower alkyl, e.g., having from 1 to 4 carbon atoms, such as methyl, ethyl, n-propyl, isopropyl, n-butyl, isobutyl and t-butyl.

Compounds I are obtained by treatment of a lower alkyl ester of a 17α-carboxyethynyl-18-lower alkyl substituted or unsubstituted-estradiol- or 3-lower alkyl ether thereof, i.e. a compound II, with a (lower) alklthiol under basic conditions. Said reaction is carried out essentially in the the absence of oxygen, preferably under nitrogen gas, an an inert solvent, e.g., methanol, under basic conditions. The basic conditions are conveniently provided by a base which is substantially inert under the reaction conditions and is soluble in the reaction medium, such as a tertiary amine, e.g., triethylamine. The reactants are intimately admixed at relatively low temperature, e.g., from about −10° to +5° C., preferably at about 0° C., and the temperature of the reaction mixture gradually allowed to rise to up to about 35° C., preferably to about 25° C.

Compounds II may be obtained by a process involving reacting an organo metallic compound having a

—C≡CCOOR³ moiety, i.e. a compoundt III, with an estrone or -3-lower alkyl ether thereof which may be substituted or unsubstituted at the 18-position, the substituents being methyl, dimethyl or ethyl, i.e. a compound IV, to form the corresponding metallic salt of the resultant lower alkyl ester of a 17α-carboxyethynyl-estradiol or 3-alkyl ether thereof, which salt is then hydrolyzed to its corresponding compound II.

The above-described method for the preparation of compounds II is conventiently illustrated by the reaction scheme, below, wherein Z, $R^1$, $R^3$ and $R^4$ are as defined above, and M is a metallo function, e.g., Mg/2 or an alkali metal, such as lithium, sodium or potassium, preferably lithium.

Reaction Scheme

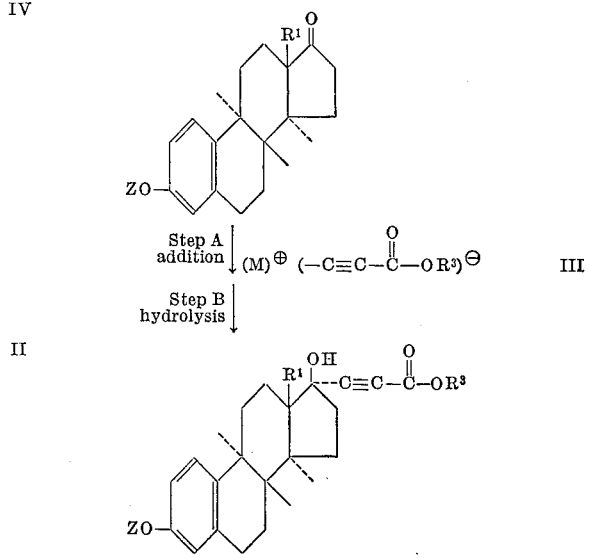

Referring to the reaction scheme above, the addition reaction (Step A) of an appropriate organo metallic compound (III) with an appropriate compound IV is carried out in conventional manner for the alkylation of a carbonyl-containing compound by means of an organo metallic reagent. For example, by intimately admixing a compound III and a compound IV under anhydrous conditions in a medium which would be suitable for carrying out a Grignard reaction, e.g., tetrahydrofuran or diethyl ether, at reduced temperatures, e.g., from −78° to −45° C., then allowing the reaction mixture to warm, e.g., up to about 0° C. Preferred ratios of compounds III to IV are from 5 to 15:1.

The hydrolysis of the salt of the resultant compound II, i.e. Step B, is carried out in the conventional manner for the liberation of an alcohol from its alcoholate salt, e.g., by dropwise addition of glacial acetic acid to the salt, with cooling.

The intermediate compounds II, wherein Z is $R^2$, i.e. compounds II′, are also obtainable by esterification under relatively mild conditions, by means known per se, of an appropriate 18-substituted or -unsubstituted- 17α-carboxyethynyl estradiol or 3-alkyl ether thereof; the substituents being methyl, dimethyl or ethyl, (the 18-position being the carbon atom of the methyl function at the 13-position of the nucleus), i.e. a compound IIa.

Suitable procedures for the esterification of a compound IIa to a compound II′, include contacting a compound IIa with a diazo (lower) alkane, e.g., diazomethane, preferably in slight molar excess, in an appropriate solvent, e.g., tetrahydrofuran and at from about 0° to 30° C., preferably from 15° to 25° C.

In preparing compounds I wherein Z is a hydrogen atom, it is preferred to protectively mask the 3-hydroxy function of the appropriate compound IV during Step A. The protective masking may be accomplished in a conventional manner, e.g., by converting the 3-hydroxy function of the appropriate compound IV to a 3-(2′-tetrahydropyranyl)ether, reacting said ether, then cleaving the ether to the corresponding 3-hydroxy-containing compound II. Thus, Step A may be carried out on 3-(2'-tetrahydropyranyl)ether of a compound IV to form the salt of corresponding compound II, then hydrolyzing the salt (Step B) under conditions which also cleave the tetrahydropyranyl ether, e.g., by incorporating water into the acidifying agent used in Step B and allowing the acidified mixture formed in Step B to stand, e.g., at from about 0° to 40° C. for at least ½ hour, preferably at from about 15° to 30° C. for from about 8 to 24 hours.

The starting materials for the preparation of compounds II, i.e., compounds IIa, III and IV are either known and can be prepared as described in the literature or they can be prepared from available materials in analogous manner to that described in the literature for the preparation of known compounds. For example, 17α-carboxyethynylestradiol-3-methyl ether [1] and its preparation are described in the U.S. Pat. 2,875,199 of John A. Cella, issued Feb. 24, 1959. Exemplary of the preparation of a compound III is the reaction of n-butyl lithium with methyl propiolate in an appropriate medium, i.e., a medium used in forming Grignard reagents, such as tetrahydrofuran, at from —80° to —50° C., under anhydrous conditions, to obtain

(Li)(—C≡C—COOCH₃)

Compounds I have an ethylenically unsaturated position (double bond) in the alkylsulfenyl function; hence, compounds I exist as geometric isomers, i.e., as cis and trans forms. The above-described procedures provide compounds I as a mixture of the geometric isomers. In some cases greater pharmacological activity or other beneficial attributes may be found with respect to a particular geometric isomer, and in such instances administration of such isomer may be preferred. The geometric isomers of compounds I may be separated by conventional means, e.g., by chromatography.

The compounds I are useful because they possess pharmacological activity in animals. In particular, compounds I are useful as estrogenic agents, as indicated by observing increase in white mouse uterine weight as described in Endocrinology 65, 265 (1959).

These compounds may be combined with pharmaceutically acceptable carrier or adjuvant. They may be administered orally or parenterally. The dosage will vary depending upon the mode of administration utilized and the particular compound employed. However, in general, satisfactory results are obtained when the compounds are administered at a daily dosage of from about 0.1 milligram to 30 milligrams. This daily dosage may be given in a single dose or divided doses, e.g., 2 times a day, or in sustained release form, independent of body weight. Dosage forms suitable for internal administration comprise from about 0.05 milligram to about 30 milligrams of the compound in admixture with a solid or liquid pharmaceutical carrier or diluent.

A representative formulation suitable for oral administration is a tablet prepared by standard tabletting techniques which contains the following:

| Ingredient | Parts by weight |
| --- | --- |
| 3' - methylsulfenyl - 3' - (3 - methoxy - 17β - hydroxy - 1,3,5 (10) - estratriene - 17α - yl)- propenoic acid methyl ester | 0.5 |
| Tragacanth | 2 |
| Lactose | 89 |
| Corn starch | 5 |
| Talcum | 3 |
| Magnesium stearate | 0.5 |

The following examples are presented as illustrative of

[1] 17α-carboxyethynylestradiol-3-methyl ether may alternatively be known as 3-methyl ether of 17α-carboxyethynyl-3,17β-estradiol.

the invention; all temperatures being centigrade unless indicated otherwise.

In the examples the compounds I are obtained as mixtures consisting of cis and trans isomers; the terms cis and trans indicating the relation of the carboalkoxy moiety to the 17-carbon of the steroid nucleus. NMR data is obtained at 60 megahertz, CDCl₃ solution using tetramethylsilane as standard. The values for the vinyl protons are given in p.p.m (parts per million downfield).

EXAMPLE 1

3 - methylsulfenyl - 3' - (3 - methoxy - 17 - β - hydroxy-1,3,5 (10) - estratriene - 17α - yl) - propenoic acid methyl ester

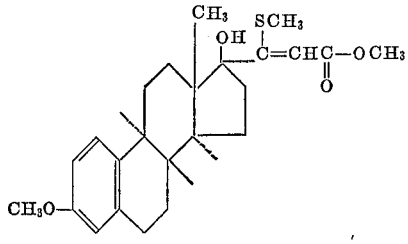

Step A: Methyl ester of 17a - carboxyethynylestradiol-3-methyl ester

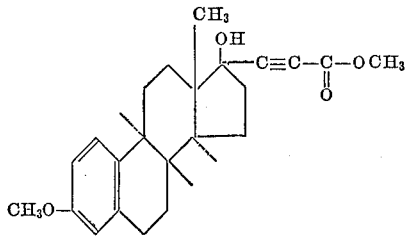

The air in a reaction vessel is replaced by nitrogen. 100 ml. of absolute tetrahydrofuran is added. The vessel is cooled by an external Dry Ice bath (—78°). A 1.6 molar n-butyl lithium solution (200 mmoles) in 125 ml. of hexane is added dropwise with stirring. A solution of 16.8 g. (200 mmoles) of methyl propiolate in 50 ml. of absolute tetrahydrofuran is added dropwise over an approx. 10-minute period with stirring; the temperature of the mixture being maintained at from —78 to —50°. The temperature is allowed to rise between about —55° and —50° for 10 minutes. Through an opening where outward nitrogen flow is maintained, 5.68 g. (20 mmoles) of powdered estrone methyl ether is added to the stirred mixture. Stirring is continued while the bath temperature is allowed to rise over a period of 3 hours to 0°. The mixture is then cooled with an ice bath and stirred for 1 hour, then 20 ml. of glacial acetic acid is dropwise added with continued cooling. The reaction mixture is then promptly concentrated by removing most of the volatile constituents in vacuo on a bath at 40°. The concentrate (a thick oil) is taken up in 200 ml. of benzene and is extracted with 300 ml. of water containing 10 g. sodium bicarbonate. The organic layer is recovered and dried with anhydrous magnesium sulfate, filtered, the cake washed with more benzene and the combined filtrate-benzene wash concentrated by removing solvent in vacuo. The concentrate is dissolved in 500 ml. of benzene and applied to a column of 125 g. of silica gel. The column is first eluted with 250 ml. of benzene and then with a 600 ml. portion of benzene. The second benzene portion is evaporated to yield crude methyl ester of 17α-carboxyethynylestradiol-3-methyl ether, which is then crystallized from 100 ml. of heptane; M.P. (132) 136–137°. The product may be further refined by two recrystallization from ether; M.P. (139) 139.5–140°.

Step B: 3'-methylsulfenyl-3'-(3-methoxy-17β-hydroxy-1,3,5(10)-estratriene-17α-yl)-propenoic acid methyl ester.—A mixture of 2 g. (5.60 mmoles) of methyl ester of 17α-carboxyethynylestradiol-3-methyl ether (obtained as described in Step A), 30 ml. of methanol and 0.16 ml. (1.12 mmoles) of triethylamine is homogenized and cooled to 0° under nitrogen gas. 0.62 ml. of (11.2 mmoles) cold liquid methanethiol is injected. The mixture is stirred at 0° for 1 hour then at 25° for 2 days. The volatile components are removed in vacuo below 25°. The residue is recrystallized from methanol to obtain as a white crystalline product 3'-methylsulfenyl-3'-(3-methoxy-17β-hydroxy-1,3,5(10)-estratriene - 17α-yl)-propionic acid methyl ester; M.P. (110) 114–122°. The product may be further refined by two more recrystallizations from methanol; M.P. (106) 113–118°.

NMR spectrum of the product:

| Vinyl protons: | P.p.m. |
|---|---|
| Cis isomer | 5.60 |
| Trans isomer | 6.23 |

3'-methylsulfenyl-3'-(3-methoxy - 17β - hydroxy-1,3,5 (10)-estratriene-17α-yl)-propenoic acid methyl ester exhibits a mild progestational activity, as well as estrogenic activity and is, therefore, additionally useful as an ovulation inhibiting agent in mammals, such as primates, and for the treatment of menstrual dysfunction in higher primates.

The compound may be administered for these uses in the manner and forms described above, at a daily dosage of 0.1 milligram to 10 milligrams. The progestational activity is indicated by the rabbit deciduoma test described by Elton et al. (Experientia, vol. XXII, 1966).

Following the procedure described in Step B of this example, but using an equivalent amount of ethanethiol in place of the methanethiol, 3'-ethylsulfenyl-3'-(3-methoxy-17β-hydroxy-1,3,5(10)-estratriene-17α-yl) - propenoic acid methyl ester is obtained as an oil which may be characterized by its NMR spectrum:

| Vinyl protons: | P.p.m. |
|---|---|
| Cis isomer | 5.59 |
| Trans isomer | 6.21 |

EXAMPLE 2

Methyl ester of 17α-carboxyethynylestradiol-3-methyl ether (alternative)

A solution of 100 mg. of 17α-carboxyethynylestradiol-3-methyl ether is prepared in 5 ml. of tetrahydrofuran. With stirring 2 ml. of 0.3 molar ethereal solution of diazomethane is added. Stirring is continued for 5 minutes, after which period the excess diazomethane is consumed by adding a few drops of acetic acid (indicated by the loss of the yellow color). The solution is concentrated to a glassy residue in vacuo. The residue is taken up in 10 ml. of boiling heptane. On slow cooling and after filtration the methyl ester of 17α-carboxyethynylestradiol-3-methyl ether is obtained as white crystals; M.P. (135) 137–138°.

The preceding steps are carried out at room temperature (about 25°) except where indicated otherwise.

EXAMPLE 3

3'-methylsulfenyl-3'-(3,17β-dihydroxy-1,3,5(10)-estratriene-17α-yl)-propenoic acid methyl ester

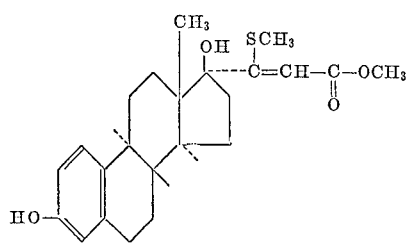

Step A: Methyl ester of 17α-carboxyethynylestradiol

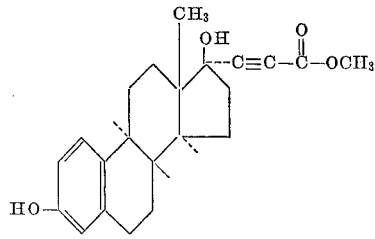

The procedure described in Step A of Example 1 is followed except that an equivalent amount of the 3-(2'-tetrahydropyranyl) ether of estrone is used in place of the estrone methyl ether, and the solution of product, i.e., methyl ester of 17α-carboxyethynylestradiol-3-(2'-tetrahydropyranyl) ether, recovered from the silica gel column is concentrated, under vacuum, the concentrate is admixed with 100 fold volume of a solution of water-glacial acetic acid-methanol (v./v. ratio of 1:1:10). The resultant mixture is stirred at 25° for 18 hours then concentrated under vacuum to obtain a residue. The residue is crystalized from benzene to obtain methyl ester of 17α-carboxyethynylestradiol; M.P. 164 to 166°.

Step B: 3'-methylsulfenyl - 3' - (3,17β-dihydroxy-1,3,5 (10)-estratriene-17α-yl)-propenoic acid methyl ester.— Following the procedure in Step B of Example 1, but replacing the methyl ester of 17α-carboxyethynylestradiol-3-methyl ether with an equivalent of the methyl ester of 17α-carboxyethynylestradiol (obtained as described in Step A, above), 3'-methylsulfenyl-3'-(3,17β-dihydroxy-1,3,5(10)-estratriene-17α-yl)-propenoic acid methyl ester is obtained as an oil, which may be characterized by its NMR spectrum:

| Vinyl protons: | P.p.m. |
|---|---|
| Cis isomer | 5.58 |
| Trans isomer | 6.20 |

Following the procedure described in Step B of this example, but using an equivalent amount of ethanethiol in place of the methanethiol, 3'-ethylsulfenyl-3'-(3,17β-dihydroxy-1,3,5(10)-estratriene-17α - yl) - propenoic acid methyl ester is obtained as an oil, which may be characterized by its NMR spectrum:

| Vinyl protons: | P.p.m. |
|---|---|
| Cis isomer | 5.60 |
| Trans isomer | 6.21 |

What is claimed is:
1. A compound of the formula

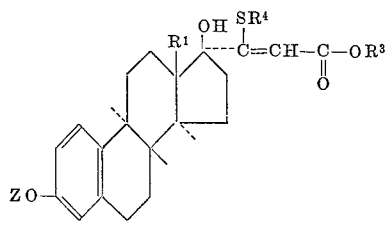

wherein

Z is a hydrogen atom or $R^2$;
$R^1$ is lower alkyl having from 1 to 3 carbon atoms; and each of $R^2$, $R^3$ and $R^4$ is, independently, lower alkyl.

2. The compound of claim 1 which is 3'-methylsulfenyl-3'-(3-methoxy-17β-hydroxy-1,3,5(10) - estratriene-17α-yl)-propenoic acid methyl ester.

3. The compound of claim 1 which is 3'-ethylsulfenyl-3'-(3-methoxy-17β-hydroxy - 1,3,5(10) - estratriene-17α-yl)-propenoic acid methyl ester.

4. The compound of claim 1 which is 3'-methylsulfenyl-3'-(3,17β-dihydroxy - 1,3,5(10) - estratriene-17α-yl)-propenoic acid methyl ester.

5. The compound of claim 1 which is 3'-ethylsulfenyl-3'-(3,17β-dihydroxy - 1,3,5(10) - estratriene-17α-yl)-propenoic acid methyl ester.

6. A therapeutic composition comprising a compound of claim 1 and a pharmaceutically acceptable carrier therefor.

References Cited

UNITED STATES PATENTS 2,875,199  2/1959  Cella _____ 260—239.57

LEWIS GOTTS, Primary Examiner

E. G. LOVE, Assistant Examiner

U.S. Cl. X.R.

260—239.55, 397.1